Figure 1:
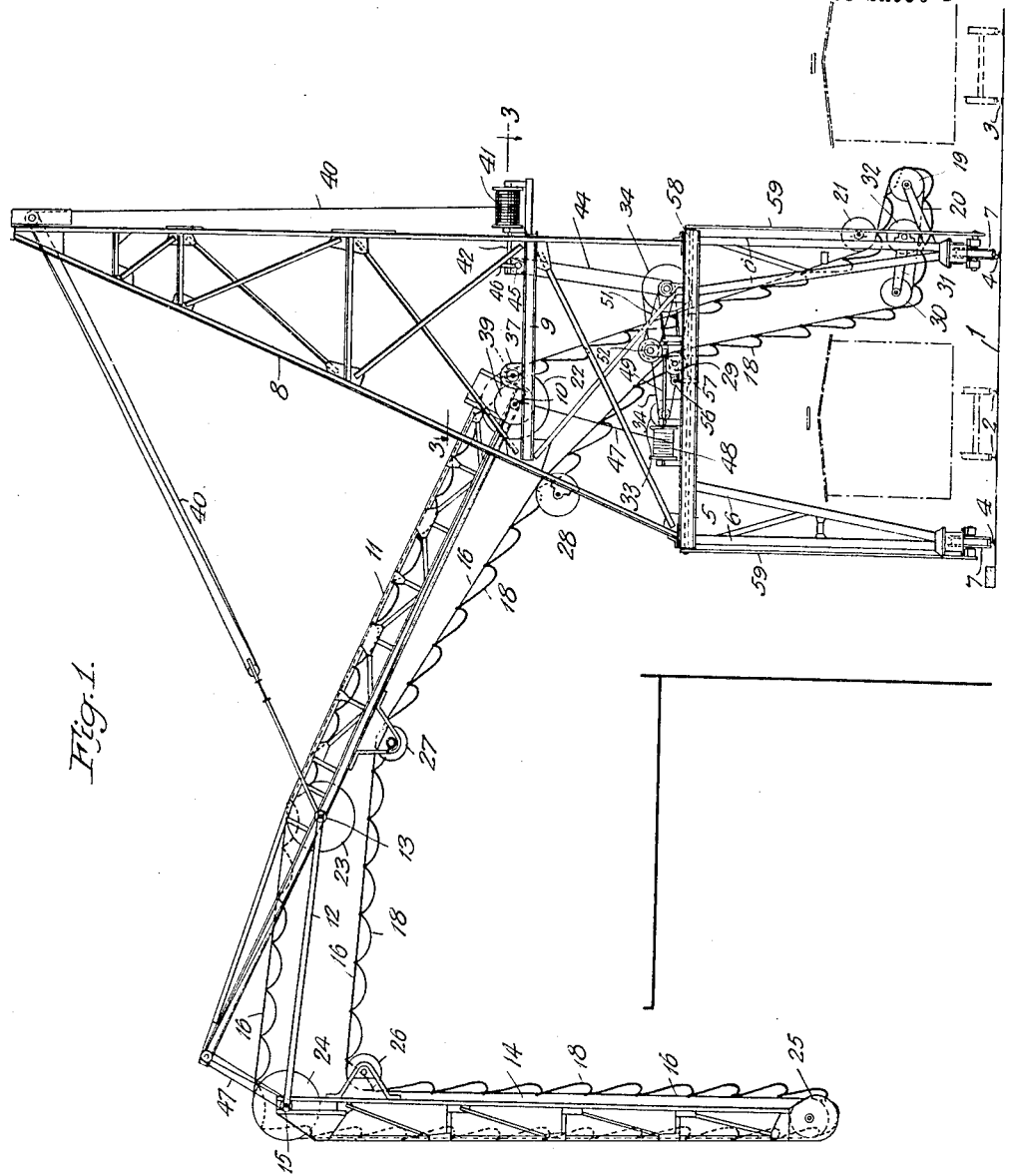

April 24, 1928.

B. N. DAVIS 1,666,995

MACHINE FOR LOADING AND UNLOADING SHIPS

Filed June 1, 1925

3 Sheets-Sheet 1

INVENTOR.
Bemiss N. Davis
BY
Stockbridge & Borst
ATTORNEYS

April 24, 1928.

B. N. DAVIS 1,666,995

MACHINE FOR LOADING AND UNLOADING SHIPS

Filed June 1, 1925

3 Sheets-Sheet 3

INVENTOR.
Bemiss N. Davis
BY
Stockbridge & Borst
ATTORNEYS

Patented Apr. 24, 1928.

1,666,995

UNITED STATES PATENT OFFICE.

BEMISS N. DAVIS, OF NEW ORLEANS, LOUISIANA.

MACHINE FOR LOADING AND UNLOADING SHIPS.

Application filed June 1, 1925. Serial No. 34,019.

This invention relates to machines for loading and unloading fruit and the like into and out of ships.

Such machines are of two general types of which the machines of one of these types are comparatively small machines designed to be stored on a dock when not in use and to be moved so that when in use they are supported entirely upon the ship or, in the case of some machines, partly upon the ship and partly upon the dock, and the machines of the other type being larger machines designed at all times to remain upon the dock; and the machine of the present invention belongs to the latter type.

The machines of this latter type have commonly been mounted on wheels to run on widely spaced track rails laid on the dock, so that the machine could be moved along the edge of the dock for use at any point and also permitting the machine to be moved away to clear the dock for other uses when the machine is not in use.

Heretofore machines of this latter type have been largely used for loading and unloading bananas into and from ships and from and into railway cars on the docks. Commonly a railway track runs along the dock between the track rails for the machine, and other railway tracks run along the dock inward of the dock from the inward track rail for the machine, i. e., inward from the water and towards the land. When such a machine is in use it blocks the outermost railway track (the track nearest the water) so that this track not only can not be utilized for cars from which bananas are to be unloaded and loaded into a ship but the track is rendered useless. Therefore, in using such a machine all the bananas have to be taken from cars on the tracks inward or landward from the machine. Commonly, with these prior machines, the bananas were taken first from cars on the next adjacent inward track, or second track from the edge of the dock. When the cars on this track were emptied, the loading of the ship had to be stopped, the machine and men being idle and the loading being delayed until the empty cars could be pulled out, after which the bananas would be taken from cars on the next or third inward track; the track nearest the edge of the dock and running under the machine being blocked thereby against use. When the cars on this third track were emptied, again the loading had to stop until loaded cars could be run in on the track from which the loading was first done, and so on, in the cycle of intermittent periods of work and idleness, with the consequent delays in loading. With the machine used for unloading a ship, obviously, similar delays would occur.

An object of the present invention is to provide a machine of the latter or large type above noted which provides for the fruit or the like being continuously supplied to it in a ship loading operation, or similarly taken from it in unloading, thereby permitting uninterrupted operation, without the above noted periods of idleness and delay. Other more particular objects and advantages of the invention will hereinafter appear.

In carrying out the invention the frame of the machine is provided with spaced supporting legs or gantry legs arranged to occupy positions inward and outward relatively to the edge of the dock or wharf and to straddle the outermost railway track and cars thereon for the location or movement of the cars between the gantry legs, and the endless conveyor of the machine is so arranged and guided that cars on the outermost track (nearest the water) may be used in loading and unloading operations as well as cars on the inward tracks, so that cars may be available on one of the tracks while on another available track the cars are being taken away and replaced. The invention also includes various features of construction and combinations of parts as will appear from the following description.

The machine illustrated in the accompanying drawings as an embodiment of the invention will now be described, after which the invention will be pointed out in the claims.

Figure 2:
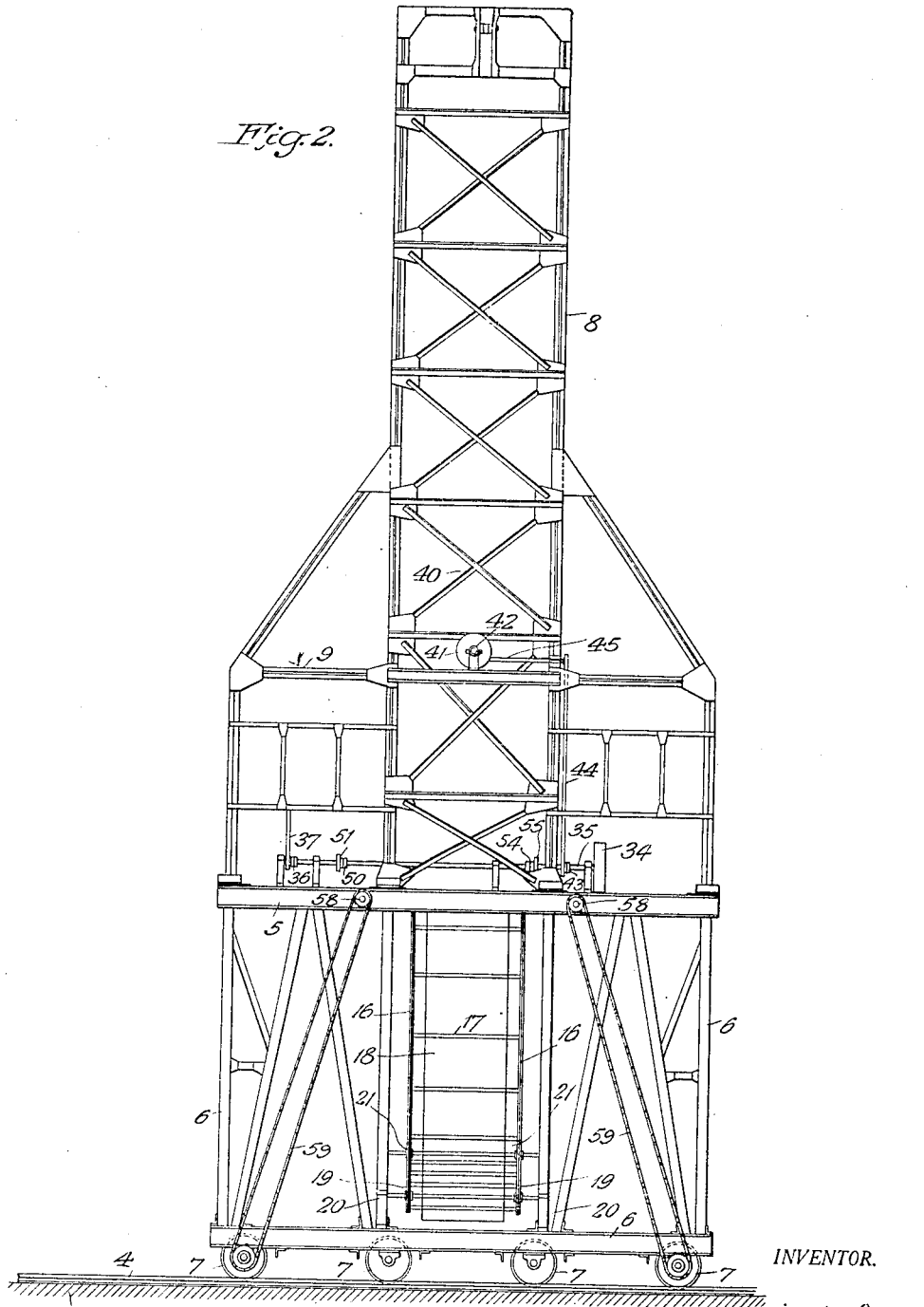
Figure 3:
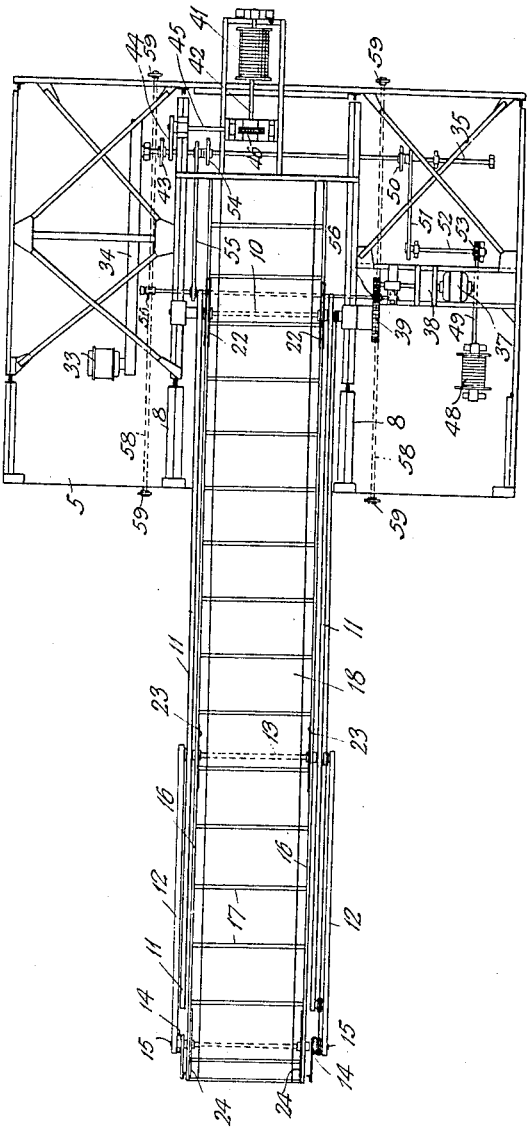

In the accompanying drawings, Fig. 1 is an end elevation, Fig. 2 a front elevation and Fig. 3 is a plan view partly in horizontal section on the line 3—3 of Fig. 1, of a machine embodying the invention. Fig. 1 also showing diagrammatically a ship alongside a wharf or dock upon which the machine is located.

The dock 1 has thereon the usual railway tracks shown as an outermost track 2, an inward track 3, and inward from track 3 there may be yet other tracks, as is usual. The dock also has thereon, substantially as usually, a pair of widely spaced track rails 4 for a ship loading and unloading machine of the type to which the present invention belongs, one of these track rails being located outward from the outer railway track 2 and along the edge of the dock and the other rail being between the outer railway track 2 and the next inward track 3.

The frame of the machine illustrated as an embodiment of the invention includes a lower frame part comprising an elevated floor frame 5 to which are secured inwardly and outwardly spaced gantry legs 6 which support the entire machine upon the track rails 4, being provided with a suitable number of ground wheels or track wheels 7, this frame part comprising suitably arranged beams and braces so as to be strong and rigid. A tapering upper frame part or tower 8 is firmly secured to the lower frame part and rises from its floor frame 5, the tower being provided with an upper or second floor frame 9.

At 10 on the floor frame of the tower a main boom 11 is pivoted to swing in a vertical plane and to extend over the ship, on the main boom inward from its free outer end an auxiliary boom 12 is similarly pivoted at 13, and from the outer end of the auxiliary boom a depending marine leg 14 is pivotally suspended at 15. Suitable tackle hereinafter referred to, is provided for raising and lowering the booms. By means of this tackle the marine leg may be lowered through the hatchways into the hold of the ship, or it may be raised clear of the ship, with both of the booms substantially vertical, if desired. In the drawings (Fig. 1), for lack of space, the marine leg is shown as only partly lowered into the hold of the ship.

A suitable endless flexible conveyor, shown diagrammatically, comprises side elements 16, such as chains, connected by rods 17 from which hang flexible sagging pockets 18 which may be of canvas and in which the fruit or the like is carried. In a general sense the endless conveyor may be said to comprise three portions. A conveyor portion or bight depending from the outer end of the auxiliary boom 12, for entering the hold of the ship, is guided on the marine leg 14; an intermediate double transverse portion, which when the machine is in use is commonly substantially horizontal, is guided on the booms and upper frame part; and a third conveyor portion or bight descends from the upper frame part or tower 8 to the lower frame part adjacent or alongside the inward gantry leg 6 and is guided thereon in proximity to the dock 1.

The guiding means for the endless conveyor will now be described: At the lower end of the said descending portion the conveyor, by means of its side elements or chains 16, is guided around a pair of wheels 19 carried by brackets 20 mounted on the adjacent gantry leg. From the guide wheels 19 the conveyor passes rearwardly, at a slight upward inclination, beneath a pair of guide wheels 21 journaled on the gantry leg, and thence extends upward at a slight inclination over a pair of guide wheels 22 journaled on the upper floor frame 9 coaxially with the pivot 10 of the main boom 11. From the wheels 22 the upper run of the transverse portion of the conveyor extends along the main boom 11 and over guide wheels 23 journaled thereon coaxially with the pivot 13 of the auxiliary boom 12, and thence along the auxiliary boom over guide wheels 24 on the other end thereof coaxial with the pivot 15 of the marine leg 14. The outer run of the depending portion of the conveyor extends downward along the marine leg and at the lower end thereof passes around a pair of wheels 25 journaled thereon. From the lower wheels 25 the return run of the conveyor extends upward along the marine leg and passes over guide wheels 26 thereon adjacent the lower side of the auxiliary boom, thence beneath the auxiliary boom above guide wheels 27 on the lower side of the main boom adjacent the inner or pivoted end of the auxiliary boom, thence beneath the main boom and over guide wheels 28 on the tower 8 adjacent the inner or pivoted end of the main boom. From the wheels 28 the return run of the conveyor descends at an inclination and is guided by wheels 29 on the main floor frame 5, whence it extends downward at a slight inclination to and beneath a pair of guide wheels 30 carried by brackets 31 mounted on the adjacent gantry leg. From the wheels 30 the return run of the conveyor is guided back to the lower side of the first mentioned guide wheels 19 by a pair of intermediate wheels 32 beneath which the conveyor passes and which are mounted on the gantry leg below the above mentioned guide wheels 21. Wheels 30 carried by brackets 31 constitute a take-up. The brackets are pivoted on the shaft which carries wheels 32 and the shaft which carries wheels 30 is weighted. This take-up may be located elsewhere, as for example, at floor level 5.

Power means are provided for operating the conveyor, the tackle for the booms, and for moving the machine along the dock on the track rails 4 by means of its track wheels 7, such power means for the booms and track drive being shown as an electric motor 33 located on the main floor frame 5, and such power means for operating the conveyor being shown as a separate electric motor 37 located on the upper floor frame 9. Speed-reducing gearing, shown as comprising belt gearing 34, is provided for connecting the motor 33 to a countershaft 35 on the main floor frame 5.

The pivot 10 for the main boom 11 is a shaft upon which the guide wheels 22 are fixed, these wheels being sprockets engaging the conveyor chains 16 to impart traveling movement to the conveyor upon rotation of the shaft 10. Speed-reducing gearing is provided for connecting the motor 37 to the conveyor operating shaft 10, shown as comprising a gear box 38 (containing speed-reducing gears) on the second floor frame 9, and spur gearing 39.

The cable 40 of the tackle for raising and lowering the main boom 11 is wound on a drum 41 located on the second floor frame 9 and fixed on a shaft 42 which may be connected to the countershaft 35 through speed-reducing gearing comprising a suitable clutch 43, sprocket gearing 44, a short shaft 45 and worm gearing 46.

The cable 47 of the tackle for raising and lowering the auxiliary boom 12 is wound on a drum 48 on the main floor frame 5 and fixed on a shaft 49 which may be connected to the counter-shaft 35 through speed-reducing gearing comprising a suitable clutch 50, sprocket gearing 51, a short shaft 52, and worm gearing 53.

For effecting movement of the machine to different locations along the dock, some of the track wheels 7 at the front and rear of the machine may be connected to the counter-shaft 35 through speed-reducing gearing comprising a suitable clutch 54, sprocket gearing 55, a shaft 56, worm gearing 57 at each end of the latter shaft, a pair of transverse shafts 58 on the main floor frame 5, and sprocket gearing 59 connecting the latter shafts to the track wheels 7.

It is evident, according to the manner of carrying out the invention, that the two pivotally jointed booms 11 and 12 provide not only for the raising or lowering of the marine leg 14, according to the height of the ship, its extent of submergence, or the depth of its hold, etc., but also provide for moving the marine leg inward or outward, according to the beam or width of the ship. It should be noted that the power drive for the long endless conveyor is applied thereto at the most advantageous point, both for loading and unloading operations, and particularly so for loading, for which machines of this type are for the most part employed.

With the driving power applied to the conveyor chains 16 by the sprocket wheels 22 on the pivot shaft 10 for the main boom 11, the load-carrying pockets 18 carried by these chains will be lifted directly, in the loading of a ship, and in unloading, the lifting of the loaded pockets along the marine leg 14 is almost as direct. This requires less power, decreases wear and, of more importance, by a minimum of strain on the conveyor chains 16, greatly lessens the liability of breakage with a consequent shut-down for repairs. For example, were the conveyor chains, such as 16, driven from the lower end of their loop or bight adjacent the dock 1, then both in loading and unloading a ship and particularly in loading, the loads would have to be lifted through long stretches of these chains making many turns or angles over the conveyor guides.

It is to be noted, as shown in Fig. 1 that railway cars may run freely along the outermost track 2 between the gantry legs 6 outward from the above described descending conveyor portion which is guided on the inward gantry leg.

In loading a ship the fruit or the like may, as heretofore, first be taken from the cars on the second inward track 3 and when these are emptied the fruit or the like may be taken from the cars on the first or outermost track 2 without any stoppage of operation. While the loading is taking place from the latter cars the empty cars on the inward track 3 may be replaced with loaded cars. When the cars on the outermost track 2 are emptied, then the loading, without stopping, may take place from the cars which have been placed on the inward track 3, while the empty cars on the outermost track 2 may be replaced with loaded cars, and so on, the operation proceeding continuously until the ship is loaded, without delays and periods of idleness of the machine and men, as heretofore.

Furthermore, since the machine of the present invention renders the outermost track 2 available to be used for all purposes, cars thereon may be run past the machine to any point along the dock for thus transporting anything desired; and in this connection it is to be noted that two or more of the machines may be in operation at the same time at different places along the dock, for different ships, the loading operations of all the machines taking place at the same time from cars on the outermost track 2 as well as from the inward tracks.

Also it is to be noted that the machines of the present invention increase the car capacity of the wharf to the extent of one more available track for the placing of loaded cars, this being important by reason of the fact that the railroad yards are often at some distance from the wharf or dock. In order to obtain this increased car capacity with the machines formerly used it would be necessary to build the dock fourteen feet wider, for an additional track, as the track occupied by these former machines could not be used for any other purpose.

When the machine of the present invention is employed for unloading ships, the entire operation is substantially reversed in relation to that above described.

It is obvious that various modifications may be made in the construction shown in the drawings and above particularly described within the principle and scope of the invention as pointed out in the appended claims.

I claim:

1. A machine for loading and unloading fruit and the like into and out of ships comprising a rigid supporting frame designed to be located entirely upon a dock and having gantry legs arranged inward and outward so vehicles may travel along the dock between the gantry legs, a boom connected to the frame above the gantry legs and adapted to overhang the ship, an endless conveyor, means carried by the frame and its boom for guiding the conveyor, and power-driven means for operating the conveyor in engagement with the load-carrying run thereof adjacent the frame-connected end of the boom, said conveyor including a bight portion guided on the frame and descending from the power-driven means into proximity to the dock permanently adjacent the inward gantry leg so that vehicles may be located outward relatively to said descending conveyor portion, said conveyor being guided on the boom and extending outward along the boom from the power-driven means and having a bight portion depending from the boom to enter the hold of the ship.

2. A machine for loading and unloading fruit and the like into and out of ships comprising a frame part having inward and outward gantry legs for supporting the machine upon a dock so vehicles may travel along the dock between the gantry legs, a tower upon said frame part, a main boom pivoted on the tower to swing in a vertical plane and adapted to extend over the ship, an auxiliary boom pivoted on the main boom to swing in a vertical plane, an endless conveyor, means for guiding the conveyor on said frame part and tower and booms, and power-driven means for operating the conveyor in engagement therewith adjacent the pivot point of the main boom on the tower, said conveyor including a portion depending from the auxiliary boom for entering the hold of the ship and another portion descending into proximity to the dock adjacent the inward gantry leg and guided thereon so that vehicles may be located outward relatively to said descending conveyor portion.

3. A machine for loading and unloading fruit and the like into and out of ships comprising a rigid frame having inward and outward gantry legs for supporting the machine upon a dock so vehicles may travel along the dock between the gantry legs, a main boom pivoted on the frame above the gantry legs to swing in a vertical plane and to extend over the ship, an auxiliary boom pivoted on the main boom to swing in a vertical plane and providing for varying the effective length of the connected booms, an endless conveyor having chains, means for guiding the conveyor chains on said frame and booms including driving sprockets for the conveyor coaxial with the pivot of the main boom on the frame, and power-driven means for rotating said sprockets, said conveyor including a bight portion depending from the auxiliary boom for entering the hold of the ship and another bight portion the load-carrying run of which passes over said sprockets and which descends into proximity to the dock adjacent to and is guided on the inward gantry leg so that vehicles may be located both inward and outward relatively to said descending conveyor portion, and whereby the driving power is applied to the conveyor at an intermediate point of its load-carrying run and at a turning point therein.

4. A loading and unloading machine for ships comprising a rigid frame having inward and outward gantry legs, a main boom pivoted on the frame above the gantry legs to swing in a vertical plane over the ship, an auxiliary boom pivoted on the main boom to swing in a vertical plane and vary the effective length of the two booms taken together, a depending marine leg to enter the hold of the ship pivoted to the outer end of the auxiliary boom to provide for the swinging of the booms, an endless conveyor having chains, means for guiding the load-carrying and return runs of the conveyor on the frame from a point on the inward gantry leg in proximity to the dock along the booms and along the length of the marine leg, said guiding means for the load-carrying run of the conveyor including wheels coaxial with the pivot of the marine leg on the auxiliary boom and other wheels coaxial with the pivot of the auxiliary boom on the main boom and driving sprockets coaxial with the pivot of the main boom on the frame, and power-driven means for rotating said sprockets thereby to drive the conveyor.

In witness whereof, I hereunto subscribe my signature.

BEMISS N. DAVIS.